US010385723B2

(12) United States Patent
Flynn et al.

(10) Patent No.: US 10,385,723 B2
(45) Date of Patent: Aug. 20, 2019

(54) TURBINE ENGINE CLEANING SYSTEMS AND METHODS

(71) Applicant: General Electric Company, Schenectady, NY (US)

(72) Inventors: Peter Andrew Flynn, Delmar, NY (US); Michael Edward Eriksen, Cincinnati, OH (US); Lloyd Eric Rawson, Mason, OH (US)

(73) Assignee: General Electric Company, Schenectady, NY (US)

(*) Notice: Subject to any disclaimer, the term of this patent is extended or adjusted under 35 U.S.C. 154(b) by 556 days.

(21) Appl. No.: 15/071,254

(22) Filed: Mar. 16, 2016

(65) Prior Publication Data

US 2017/0268377 A1 Sep. 21, 2017

(51) Int. Cl.
*F01D 25/00* (2006.01)
*B08B 3/02* (2006.01)
(Continued)

(52) U.S. Cl.
CPC .............. *F01D 25/002* (2013.01); *B08B 3/02* (2013.01); *B08B 9/093* (2013.01); *B08B 13/00* (2013.01); *F02C 3/04* (2013.01); *F02C 7/00* (2013.01); *F04D 29/324* (2013.01); *F05D 2220/32* (2013.01); *F05D 2220/323* (2013.01); *F05D 2240/24* (2013.01); *F05D 2240/35* (2013.01); *F05D 2240/60* (2013.01); *Y02T 50/672* (2013.01)

(58) Field of Classification Search
CPC ..................................................... F01D 25/002
See application file for complete search history.

(56) References Cited

U.S. PATENT DOCUMENTS

| | | | | |
|---|---|---|---|---|
| 3,901,444 | A | 8/1975 | Maltbie | |
| 4,046,155 | A * | 9/1977 | Mansson | B08B 3/02 134/167 R |

(Continued)

FOREIGN PATENT DOCUMENTS

| | | | | |
|---|---|---|---|---|
| AU | 2013205492 | A1 | 5/2013 | |
| CA | 2 895 923 | A1 | 6/2016 | |

(Continued)

OTHER PUBLICATIONS

Extended European Search Report and Opinion issued in connection with corresponding EP Application No. 17160658.5 dated Sep. 21, 2017.

(Continued)

*Primary Examiner* — Todd E Manahan
*Assistant Examiner* — Todd N Jordan
(74) *Attorney, Agent, or Firm* — Dority & Manning, P.A.

(57) ABSTRACT

A system and method for cleaning an installed gas turbine engine is provided. The system may include a controller on an engine core, wherein the engine core defines a primary gas path and includes at least one airfoil extending into the primary gas path. The method may include initiating a cleaning program and directing a cleaning fluid toward the engine core in response to the initiation of the cleaning program. The method may further include initiating delivery of the cleaning fluid as a non-vaporized liquid within the primary gas path to the engine core.

11 Claims, 7 Drawing Sheets

(51) Int. Cl.

| | |
|---|---|
| ***B08B 9/093*** | (2006.01) |
| ***B08B 13/00*** | (2006.01) |
| ***F02C 3/04*** | (2006.01) |
| ***F02C 7/00*** | (2006.01) |
| *F04D 29/32* | (2006.01) |

(56) References Cited

U.S. PATENT DOCUMENTS

| | | | | |
|---|---|---|---|---|
| 5,147,429 | A | 9/1992 | Bartholomew | |
| 5,464,479 | A | 11/1995 | Kenton | |
| 6,073,637 | A | 6/2000 | Hayward | |
| 6,631,384 | B1 | 10/2003 | Richman | |
| 6,659,715 | B2 | 12/2003 | Kuesters | |
| 7,178,760 | B2 | 2/2007 | Bernard | |
| 7,703,701 | B2 | 4/2010 | Louarn | |
| 8,007,565 | B2 | 8/2011 | Moredock | |
| 8,424,545 | B2 | 4/2013 | Reboa | |
| 8,464,968 | B2 * | 6/2013 | Le Louarn | B64C 1/1476 239/284.1 |
| 8,778,091 | B1 | 7/2014 | Lockyer | |
| 2009/0188031 | A1 * | 7/2009 | Dwyer | B64D 11/02 4/300 |
| 2010/0206966 | A1 * | 8/2010 | McDermott | B05B 1/14 239/590 |
| 2012/0125386 | A1 | 5/2012 | Bertolucci | |
| 2014/0290254 | A1 | 10/2014 | Manning | |
| 2015/0101641 | A1 | 4/2015 | Rice | |
| 2015/0260612 | A1 * | 9/2015 | DeSilva | G01M 15/14 702/48 |
| 2015/0322906 | A1 | 11/2015 | Gagne | |
| 2016/0160679 | A1 * | 6/2016 | Griffiths | B08B 3/003 134/57 R |

FOREIGN PATENT DOCUMENTS

| | | | | |
|---|---|---|---|---|
| WO | 94/03863 | A1 | 2/1994 | |
| WO | WO 2005028119 | A1 * | 3/2005 | B08B 3/02 |
| WO | 2005/090764 | A1 | 9/2005 | |
| WO | WO2014/123841 | A1 | 8/2014 | |

OTHER PUBLICATIONS

Office Action issued in connection with corresponding CA Application No. 2959763 dated Feb. 16, 2018.

* cited by examiner

TURBINE ENGINE CLEANING SYSTEMS AND METHODS

FIELD OF THE INVENTION

The present subject matter relates generally to turbine engines, and more particularly, to cleaning systems and methods for a gas turbine engine.

BACKGROUND OF THE INVENTION

Aircraft engines used to propel aircraft through certain routes often experience significant fouling due to heavy environmental particulate matter intake during flight, idling, taxiing, take-off, and landing. Environmental fouling degrades performance in turbine components of such aircraft engines. For example, one known mechanism for fouling is the increased roughness of turbine components caused by mineral dust ingestion. Specifically, this increased roughness can result from the formation of micropits caused by particle impact. Subsequently, mineral dust particles accumulate in these pits and block cooling passages by forming layers of fouling material therein. High temperatures on surfaces in downstream stages of the turbine result in thermal alteration and solid-state mineral reactions of the accumulated mineral dust particles, which forms a calcia, magnesia, alumina, silica (CMAS) based reaction product. Once reaction products have formed and cooled, they may become very difficult to remove. Even mineral dust particles or CMAS precursors that do not form a CMAS reaction product may still travel through relatively low-temperature portions of the engine. These dust particles may subsequently cause substantial damage through abrasion or oxidation.

Typical methods for cleaning an engine require attaching existing systems to the engine only after a flight has concluded. Such systems may require complete or partial disassembly of the engine. Often, all or some of the engine must be removed from the wing or aircraft structure to which it is mounted. Significant time and energy may be required to adequately clean internal portions of the engine, especially if CMAS accumulation or buildup has occurred. Also, although CMAS buildup becomes harder to remove once it has cooled, the engine may not be disassembled until significant cooling has occurred. The cumbersome and time-consuming nature of these methods may cause cleaning to take place only intermittently. Even when they do occur, the cumbersome and time-consuming nature of typical methods may reduce the time available to perform other post-flight maintenance operations. Moreover, they may be completely unable to address mineral dust that accumulates outside of a combustible gas flow path of the engine.

Accordingly, further improvements to cleaning methods and systems are desired. Methods and systems that provide cleaning to an engine while mounted to an aircraft structure such as a wing would be useful. Methods and systems that provide cleaning to an engine during flight or immediately thereafter would also be useful.

BRIEF DESCRIPTION OF THE INVENTION

Aspects and advantages of the invention will be set forth in part in the following description, or may be obvious from the description, or may be learned through practice of the invention.

In accordance with one exemplary embodiment of the present disclosure, a method for cleaning an installed gas turbine engine that includes an engine core, wherein the engine core defines a primary gas path and includes at least one airfoil extending into the primary gas path. The method may include initiating a cleaning program and directing a cleaning fluid toward the engine core in response to the initiation of the cleaning program. The method may further include initiating delivery of the cleaning fluid as a non-vaporized liquid within the primary gas path to the engine core.

In accordance with another exemplary embodiment of the present disclosure, a gas turbine engine is provided. The gas turbine engine may define a central axis, a radial direction, and a primary gas path extending along the central axis. The gas turbine engine may include an engine shaft extending along the central axis, a compressor, a combustion section, a turbine, a non-atomizing fluid nozzle, and a controller. The compressor may be attached to the engine shaft and include a plurality of airfoils extending along the radial direction into the primary gas path. The combustion section may be positioned downstream of the compressor to receive a compressed air flow therefrom. The turbine may be mounted on the engine shaft downstream of the combustion section to provide a rotational force to the compressor. The non-atomizing fluid nozzle may be directed into the primary gas path to selectively spraying a non-vaporized cleaning fluid to the primary gas path. The controller may be in operable communication with the non-atomizing fluid nozzle. The controller may also be configured to initiate a cleaning program within the gas turbine engine, direct the cleaning fluid to the non-atomizing nozzle in response to the initiation of the cleaning program, and initiate delivery of the cleaning fluid as a non-vaporized liquid within the primary gas path to at least one airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
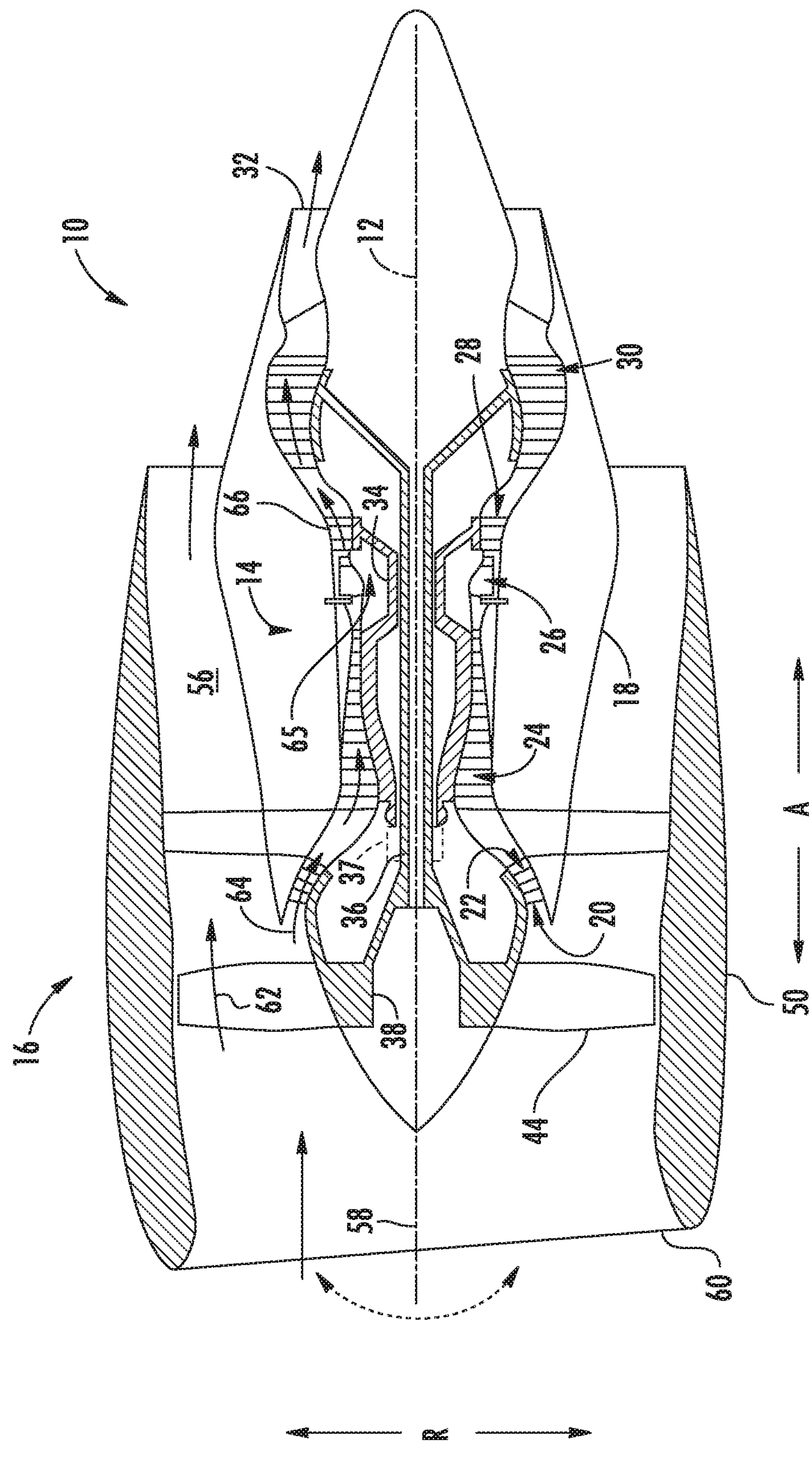
FIG. 1 provides a cross-sectional schematic view of an exemplary gas turbine engine in accordance with one or more embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure provides a system and method for cleaning a gas turbine engine while the engine is in-flight or otherwise mounted to an aircraft (i.e., on wing). Generally, a cleaning fluid is provided to a gas flow path of the engine before one or more foreign materials can accumulate on a turbine component within the gas turbine engine.

Exemplary turbine components include, but are not limited to, shrouds, blades, rotors, nozzles, or vanes. Moreover, the components may be fabricated from a metallic material. As used herein, the term "metallic" may refer to a single metal or a metal alloy. Exemplary metallic materials include, but are not limited to, nickel, titanium, aluminum, vanadium, chromium, iron, cobalt, and alloys thereof. Alternatively, turbine components may be fabricated from a non-metallic material, including but not limited to ceramic matrix composites (CMCs), polymer matrix composites (PMCs) as well as other non-metallic materials.

Referring now to the drawings, FIG. 1 is a schematic cross-sectional view of an exemplary high-bypass turbofan type engine 10 herein referred to as "turbofan 10" as may incorporate various embodiments of the present disclosure. Although the engine is shown as a turbofan, it is anticipated that the present disclosure can be equally applicable to other turbine-powered engines, such as an open rotor engine, a turboshaft engine, a turbojet engine, a geared turbofan engine, a turboprop engine, or other suitable engine configurations.

As shown in FIG. 1, the turbofan 10 has a longitudinal or axial centerline axis 12 that extends therethrough for reference purposes. In general, the turbofan 10 may include a gas turbine or core turbine engine 14 disposed downstream from a fan section 16. The core turbine engine 14 may generally include a substantially tubular outer casing 18 that defines an annular inlet 20. The outer casing 18 encases, in serial flow relationship, a compressor section having a booster or low pressure (LP) compressor 22, a high pressure (HP) compressor 24, a combustion section or chamber 26, a turbine section including a high pressure (HP) turbine 28, a low pressure (LP) turbine 30, and a jet exhaust nozzle section 32.

A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also be connected to a fan spool or shaft 38 of the fan section 16. For the exemplary embodiments depicted, the LP spool 36 is connected directly to the fan spool 38 such as in a direct-drive configuration. In alternative configurations, however, the LP spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

As shown in FIG. 1, the fan section 16 includes a plurality of fan blades 44 that are coupled to and that extend radially outwardly from the fan spool 38. An annular fan casing or nacelle 50 circumferentially surrounds the fan section 16 and/or at least a portion of the core turbine engine 14. During operation of the turbofan engine 10, a volume of air 58 enters the turbofan 10 through an associated inlet 60 of the nacelle 50 and/or fan section 16. As the volume of air 58 passes across the fan blades 44, a first portion of the air, as indicated by arrows 62, is directed or routed into the bypass airflow passage 56 and a second portion of the air, as indicated by arrow 64, is directed or routed to a primary gas path 65. Specifically, the second portion of air 64 is directed into the LP compressor 22. The pressure of the second portion of air 64 is then increased as it is routed through the HP compressor 24 and into the combustion section 26, where it is mixed with fuel and burned to provide combustion gases 66 to drive the turbines 28 and 30.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a primary gas path 65 for routing the combustion gases 66 through the core turbine engine 16. Upon operation of the engine 10 during certain conditions, one or more foreign materials (e.g., CMAS based reaction products or precursors thereto) may accumulate at various points within the core turbine engine 14.

Figure 2:
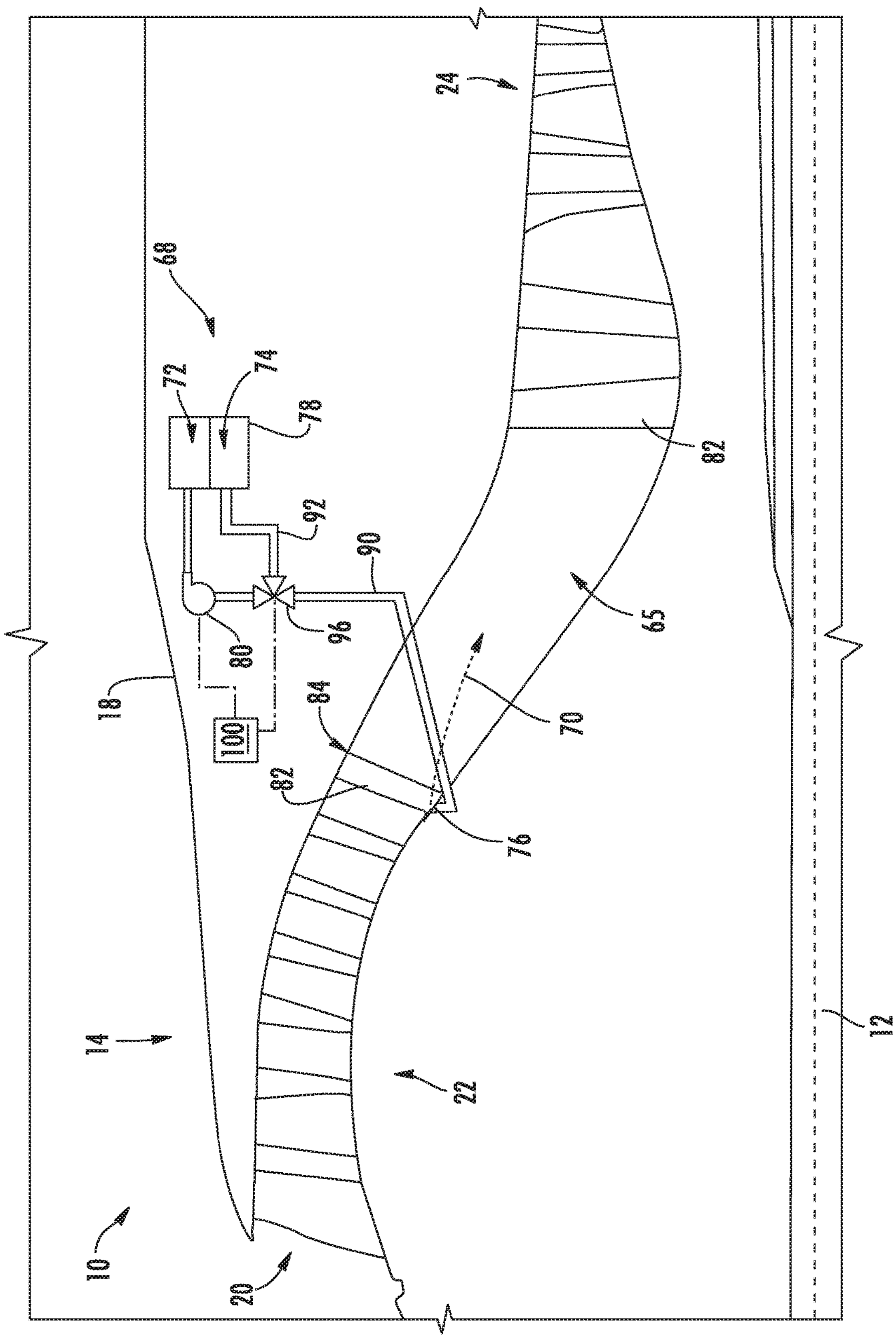
FIG. 2 provides a cross-sectional schematic view of an exemplary gas turbine engine, including a compressor section, in accordance with one or more embodiments of the present disclosure.

Turning to FIG. 2, one or more portion of the core turbine engine 14 contains all or some of the cleaning system 68, including a non-atomizing nozzle 76 for delivering a cleaning fluid 70. In turn, a portion of the primary gas path 65 may be configured to receive the cleaning fluid 70. A reservoir 78 may be attached to the outer casing 18 and enclosed therein to store at least a portion of the cleaning fluid 70. During cleaning operations, the cleaning fluid 70 may be supplied from the reservoir 78 by a pump 80 to facilitate removal and/or reduction of damaging foreign materials (e.g., a CMAS based reaction products or precursors thereto).

In some embodiments, the cleaning fluid 70 will include a primary liquid 72. For instance, the primary liquid 72 may include potable water, demineralized water, distilled water, deionized water, other sources of water on board the aircraft, and/or liquid detergent for dissolving CMAS reaction products, or precursors thereto. Before use, all or some of the primary liquid 72 may be stored within the reservoir 78. In additional or alternative embodiments, a secondary agent 74 may be included within the cleaning fluid 70. For instance, a suitable detergent (e.g., granulated, concentrated, foam, or gel detergent) may be provided as a secondary agent 74 and mixed with a portion of the primary liquid 72 before delivery of the cleaning fluid 70. Optionally, the secondary agent 74 may be directly included within the primary liquid 72, or selectively supplied thereto, as will be described below. Additionally, the cleaning fluid 70 may be stored in a discrete container or a separate portion of the reservoir 78. In some such embodiments, the mixture of the secondary agent 74 and primary liquid 72 may only occur directly before or after a portion of the primary liquid 72 is introduced into the primary gas path 65.

As referenced above, the cleaning system 68 may be configured to include one or more non-atomizing nozzles 76 in fluid communication with a portion of the core engine 14 (e.g., the compressor section at the LP compressor 22 or the HP compressor 24). During cleaning operations, and while the engine remains mounted to an aircraft wing (not pictured), a portion of the cleaning fluid 70 may be delivered or injected into the primary gas path 65 and/or annular inlet 20. In some embodiments, the injection occurs at the compressor section and upstream of the combustion section 26 and turbine(s) 28, 30 (see FIG. 1). In specific embodiments, the cleaning fluid 70 is injected as a non-vaporized liquid to strike one or more airfoil 82 of the compressor section (e.g., at the LP compressor 22 or HP compressor 24). Although the cleaning fluid 70 may eventually vaporize within the engine 10, the cleaning fluid 70 will generally remain in liquid form until after the cleaning fluid 70 strikes the airfoil 82. As described herein, the airfoil 82 may be embodied by a vane, nozzle, or rotor blade extending in the radial direction R in the LP compressor 22 or HP compressor 24.

Figure 3:
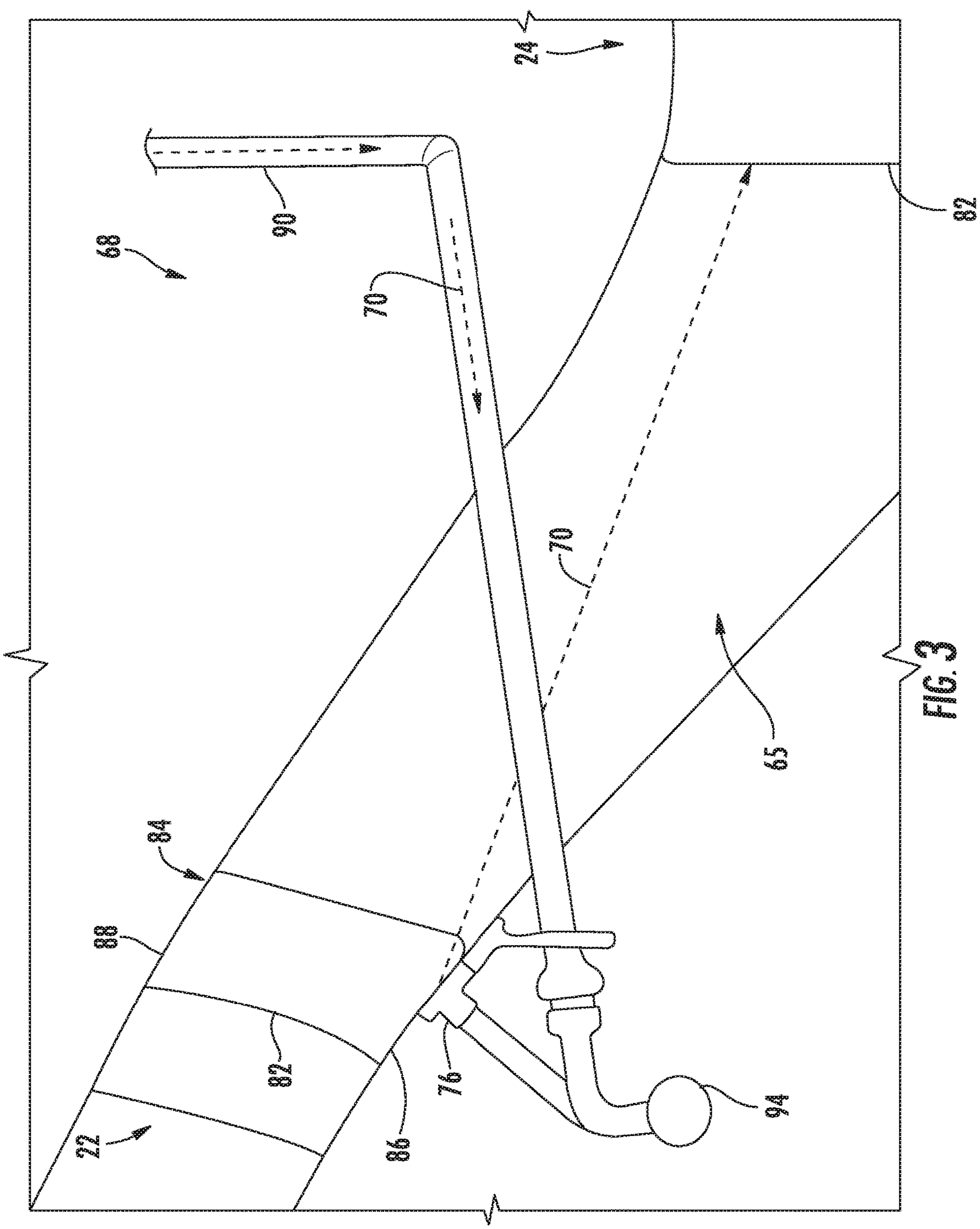
FIG. 3 provides a magnified cross-sectional view of the exemplary gas turbine engine of FIG. 2.

In the exemplary embodiments of FIGS. 2 and 3, the non-atomizing nozzle 76 is positioned in the compressor section at an aft portion of the LP compressor 22. Specifically, the non-atomizing nozzle 76 is positioned at an aft airfoil 82 on a stationary engine segment 84, the aft airfoil 82 being embodied by a stator vane. As shown, the non-atomizing nozzle 76 extends through a radially inward portion 86 of the stationary engine segment 84 into the primary gas path 65. A fluid conduit 90 or pipe extends from the reservoir 78 through the outer casing 18 and a non-rotational floor of the compressor section. In the illustrated embodiment, the fluid conduit 90 joins in fluid communication with a manifold 94 to feed cleaning fluid 70 to the non-atomizing nozzle 76. During cleaning operations, selective injections of the liquefied cleaning fluid 70 are delivered to the primary gas path 65. The delivered cleaning fluid 70 is configured to remain in liquid form as it strikes an airfoil 82 of the HP compressor 24. Additional or alternative embodiments may include one or more non-atomizing nozzle 76 positioned in the compressor section forward of the LP compressor 22 (e.g., at the annular inlet 20). In such embodiments, during cleaning operations injections of the liquefied cleaning fluid 70 are delivered to the primary gas path 65 and remain in liquid form as it strikes an airfoil of the LP compressor 22.

As shown, the exemplary embodiment of FIGS. 2 and 3 provide a non-atomizing nozzle 76 attached to an inward portion 86 of the stationary engine segment 84 and directed toward the HP compressor 24. However, other suitable configurations may be provided. For instance, additional or alternative embodiments may include a non-atomizing nozzle 76 extending from a radially outward portion 88 of the outer casing 18. In further embodiments, non-atomizing nozzles 76 may be provided at both of the radially inward portion 86 and radially outward portion 88. In such embodiments, the nozzles 76 at the radially inward portion 86 may be circumferentially aligned or staggered from the nozzles 76 at the radially outward portion 88.

Figure 4:
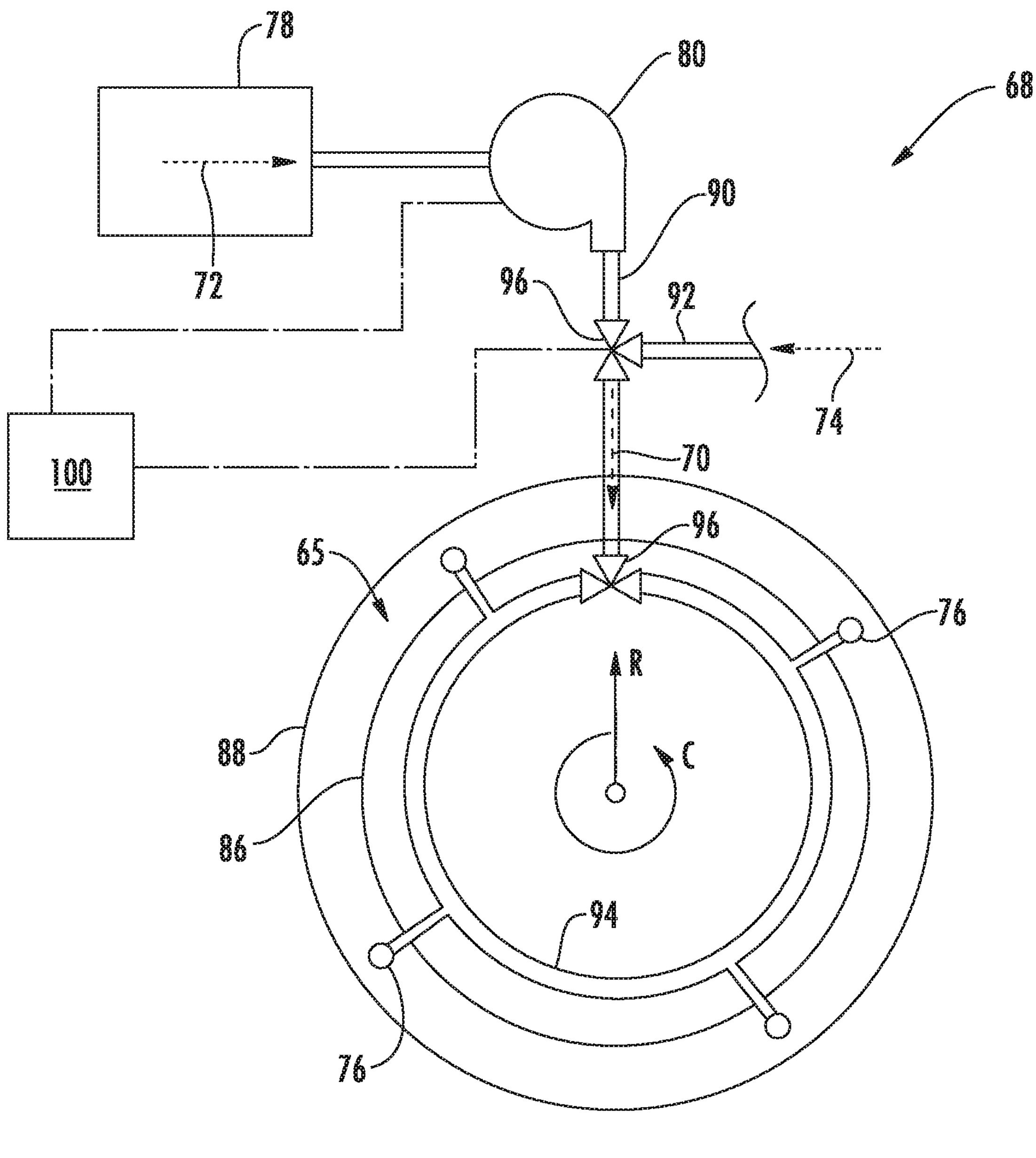
FIG. 4 provides a schematic plan view of an exemplary cleaning system in accordance with one or more embodiments of the present disclosure.
Figure 5:
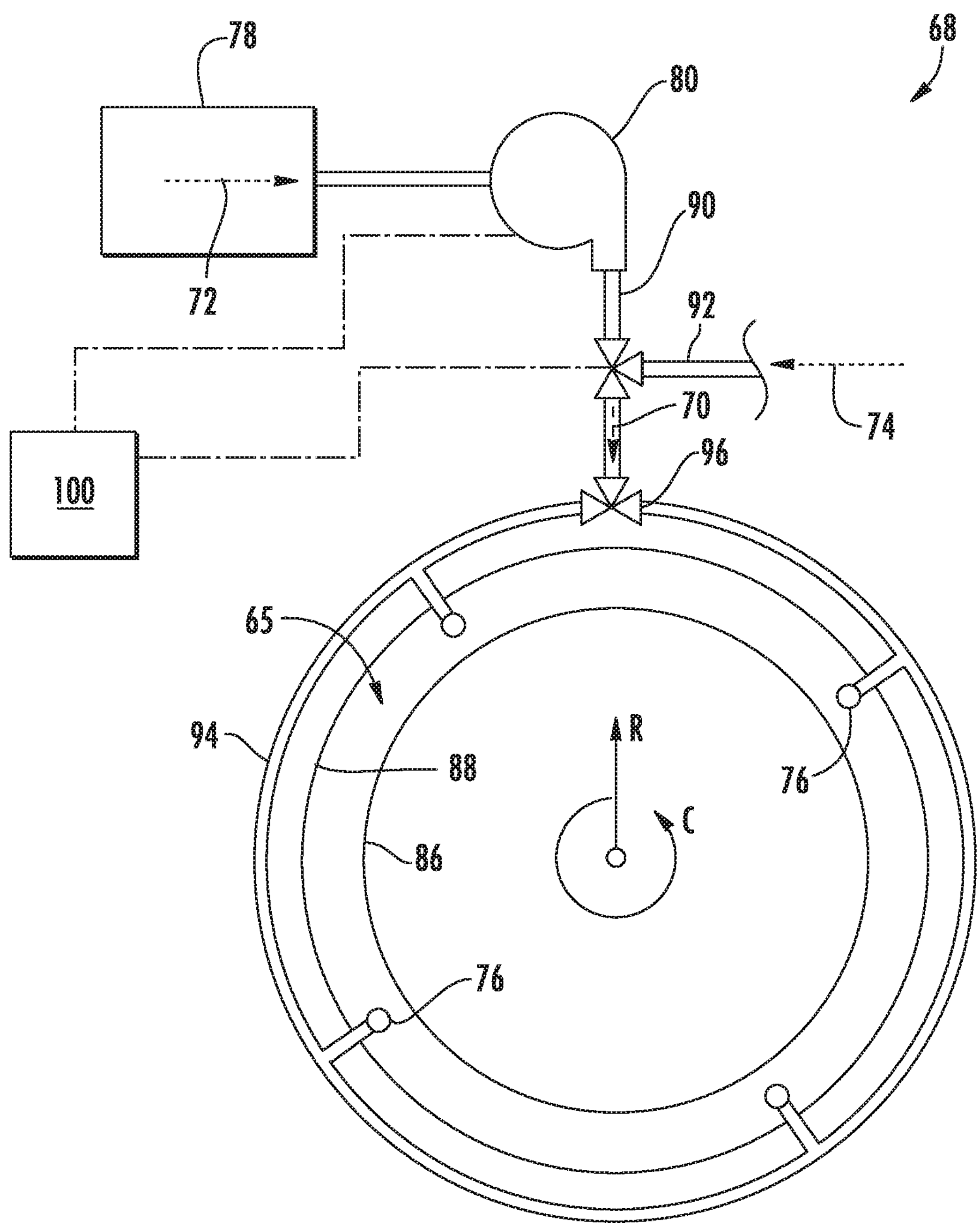
FIG. 5 provides a schematic plan view of another exemplary cleaning system in accordance with one or more embodiments of the present disclosure.

As illustrated in FIGS. 4 and 5, some embodiments of the cleaning system 68 include a plurality of non-atomizing nozzles 76 positioned at discrete points along the circumferential direction C. A tubular manifold 94 is optionally provided to selectively or uniformly supply cleaning fluid 70 to the non-atomizing nozzles 76. In the illustrated embodiments, the manifold 94 extends in the circumferential direction C about some or all of the central axis 12. Moreover, each non-atomizing nozzle 76 extends radially (i.e., along the radial direction R) from the manifold 94. For example, the non-atomizing nozzles 76 of FIG. 4 extend radially outward from the manifold 94 to spray in that same direction. The non-atomizing nozzles 76 of FIG. 5 extend radially inward from the manifold 94 to spray in that same direction.

Although the manifolds 94 and non-atomizing nozzles 76 of FIGS. 4 and 5 are shown as separate embodiments, it is understood that optional embodiments may include both manifolds 94 and non-atomizing nozzles 76, as described above. Certain embodiments will include at least two manifolds 94 and two sets of non-atomizing nozzles 76, wherein one set of non-atomizing nozzles 76 extends radially inward from one manifold 94 and the second set of non-atomizing nozzles 76 extends radially outward from another manifold 94.

As shown in FIGS. 4 and 5, the pump 80 of some embodiments is configured in selective fluid communication with the reservoir 78 and non-atomizing nozzle 76. In the illustrated embodiments of FIGS. 4 and 5, one or more valves 96 may be provided to regulate the rate of fluid flow through the fluid conduit 90. For instance, the valve 96 of some embodiments is capable of effectively shutting off the flow of cleaning fluid 70 through the fluid conduit 90 based on, e.g., a need for such cleaning fluid 70 at the non-atomizing nozzle 76. Optionally, a secondary conduit 92 may be attached to one valve 96 for selectively introducing the secondary agent 74 into the primary liquid 72. In some such embodiments, the valve 96 is configured as a standard three-way valve 96 providing a fixed ratio of secondary agent 74 to primary liquid 72. In alternative embodiments, the valve 96 is configured as a variable throughput three-way valve 96 providing a selectively changeable ratio of secondary agent 74 to primary liquid 72. The variable throughput three-way valve 96 may be configured to output anywhere from zero percent (0%) to one hundred percent (100%) of the cleaning fluid 70 as the primary liquid 72. In turn, one hundred percent (100%) to zero percent (0%) of the cleaning fluid 70 may comprise the secondary agent 74.

In some embodiments, one or more of the pump 80, valve 96, or non-atomizing nozzle 76 are operably connected with a controller 100, e.g., through a wired or wireless communications network. During operation of the cleaning system 68, the flow of cleaning fluid 70 through the fluid conduit 90 and/or pump operation (e.g., activation of the pump 80, pump speed, and/or pump flow pressure), may be controlled by the controller 100, as will be described below.

Generally, the controller 100 may include a discrete processor and memory unit (not pictured). Optionally, the controller 100 may include a full authority digital engine control (FADEC), or another suitable engine control unit. The processor may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration). Moreover, one or more sensors (not pictured) may be operably connected to the processor to provide an input signal from one or more portion of an engine.

Additionally, the memory device(s) may generally comprise memory element(s) including, but not limited to, computer readable medium (e.g., random access memory (RAM)), computer readable non-volatile medium (e.g., a flash memory, EEPROM, NVRAM or FRAM), a compact disc-read only memory (CD-ROM), a magneto-optical disk (MOD), a digital versatile disc (DVD), and/or other suitable memory elements. The memory can store information accessible by processor(s), including instructions that can be executed by processor(s). For example, the instructions can be software or any set of instructions that when executed by the processor(s), cause the processor(s) to perform operations. For certain embodiments, the instructions include a software package configured to operate the system 68 to, e.g., execute the exemplary method (200) described below with reference to FIG. 7.

Returning to FIGS. 2 and 3, in some embodiments, the controller 100 is configured to initiate a cleaning program or cycle. For example, the cleaning program may be initiated in response to a manual user input or a predetermined automated condition. A manual user input may include engaging a user interface, e.g., flipping a switch or depressing a button within the cockpit (not pictured), that is dedicated to initiating a cleaning program. A predetermined automated condition may be provided based on programmed determinations that conditions within the core turbine engine 14 have caused, or are likely to cause, accumulation/formation of a foreign material. Each cleaning program may require injection of the cleaning fluid 70 into the primary gas path 65. In response to initiation or determination of a cleaning program, the controller 100 may thus direct cleaning fluid 70 to the non-atomizing nozzle 76 and initiate delivery or injection therefrom. The delivery/injection may be ameliorative or preventive in nature. For instance, the cleaning fluid 70 directed from the non-atomizing nozzles 76 may substantially break-up or remove an accumulation of foreign material from the primary gas path 65. Additionally or alternatively, the cleaning fluid 70 may capture particulate within the engine. Captured particulate may flow with the cleaning fluid 70 to the combustion section 26 (see FIG. 1) and out of the core engine 14, thus preventing foreign materials from accumulating (e.g., forming as CMAS based reaction products) within the primary gas path 65.

Accordingly, the initiation of a cleaning program may include receiving a pre-buildup abatement signal. The signal may be provided to the controller 100 by a user-engaged interface (not pictured) or sensor (not pictured). In one embodiment, a particulate sensor may be provided on or within the engine or providing a particulate detection signal to the controller 100. Once received by the controller 100, the particulate detection signal may be used to determine if an unsuitable level of particulate (e.g., mineral dust) is present in the ambient environment. A cleaning program may be initiated based, at least in part, on whether the unsuitable level of particulate is detected. Determination of a certain level of particulate may, thus, cause direction and delivery of the cleaning fluid 70 within the primary gas path 65.

In certain embodiments, direction and delivery of the cleaning fluid 70 may be linked to temperature within the engine, e.g., temperature within the turbine(s) 28, 30 (see FIG. 1). Optionally, one or more temperature sensors (not pictured) may be positioned in or adjacent to the turbine(s). The temperature sensors may be operably connected to the controller 100 for supplying a detected temperature or temperature difference between multiple turbines. A temperature limit (e.g., absolute temperature value of a single turbine or a temperature difference value) may be indicative that foreign materials (e.g., CMAS based reaction products or precursors thereto) are likely to accumulate. Thus, the initiation of a cleaning program in some such embodiments may include determining that a predetermined temperature limit has been exceeded within the turbine(s). Advantageously, the delivery of the cleaning fluid 70 at elevated temperatures may break up accumulated foreign materials within the primary gas path 65 before they have fully cooled and set. Moreover, the delivery may cool the turbine(s) such that further foreign materials are unable to accumulate or form.

Although initiation of a cleaning program may occur during flight or combustion within the core turbine engine 14, a cleaning program may additionally or alternatively occur immediately after combustion substantially reduces or ceases, such as when the engine enters an idle mode (e.g., during taxiing or after the aircraft lands). Similarly, direction and delivery of the cleaning fluid 70 may occur during combustion or soon thereafter. In some embodiments, the initiation of a cleaning program may include determination that combustion within the core turbine engine 14, e.g., the combustion section 26 (see FIG. 1), has reduced or ceased. This determination may include detecting a rapid temperature change or communication with another portion of the engine 10. After temporary or extended combustion, the controller 100 may, thus, determine combustion has ceased or substantially reduced, direct cleaning fluid 70 to the non-atomizing nozzle 76, and initiate delivery therefrom. Cleaning soon after an engine shutdown, or while the engine 10 is idling, it may removal of CMAS and other foreign materials from internal engine components while portions of the engine 10 remain hot. Advantageously, such cleaning operations may effectively remove foreign materials (e.g., CMAS based reaction products or precursors thereto) before they are able to cool and/or harden.

Figure 6:
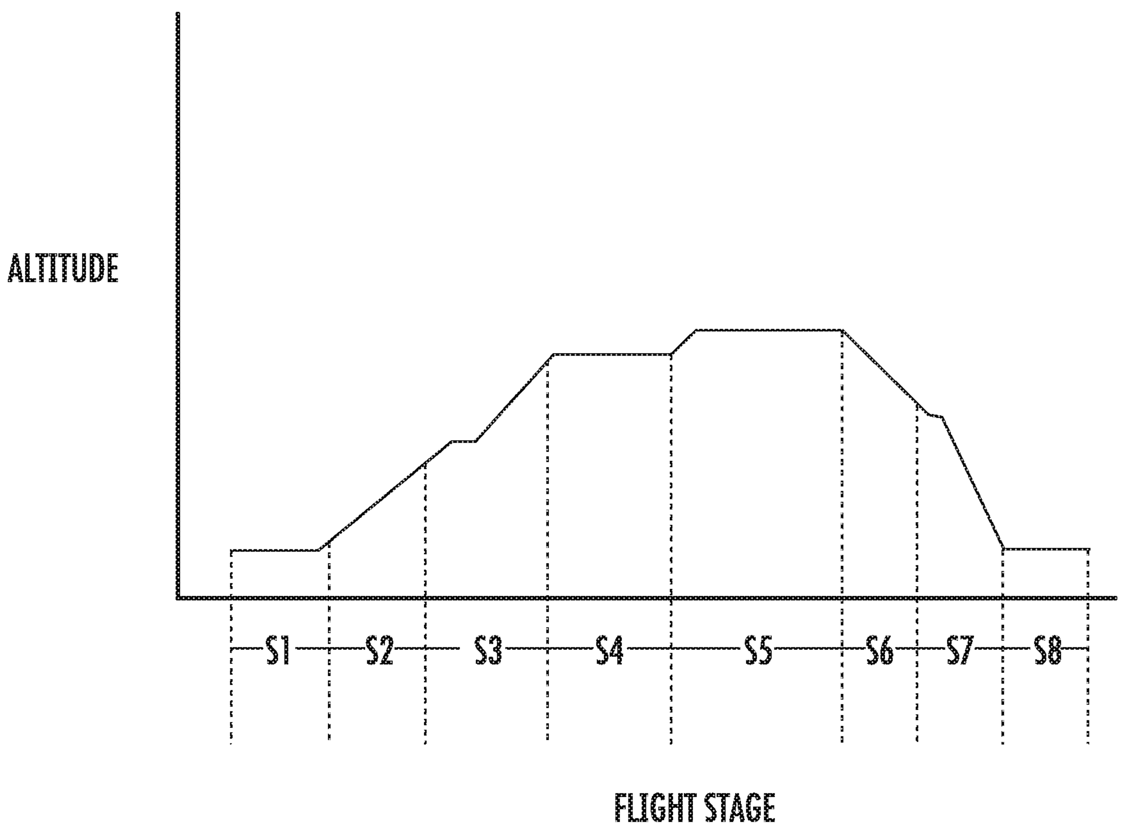
FIG. 6 provides a schematic diagram of an exemplary flight schedule in accordance with one or more embodiments of the present disclosure.

As illustrated in FIG. 6, some embodiments of the controller may be configured with a predetermined flight schedule. Generally, the flight schedule includes multiple flight stages S1 through S8 tracking aircraft or engine operation. For instance, the flight schedule may include one or more of a takeoff stage (S1), ascent stage (S2, S3), cruising stage (S4, S5), descent stage (S6, S7), and landing stage (S8). In certain embodiments, one or more of the stages Si through S8 may correspond to anticipated or programmed cleaning programs, e.g., flight through a region known to have high amounts of mineral dust particles. The controller 100 (see FIG. 2) may be configured to establish when various flight stages have been reached to initiate a cleaning program. In an exemplary embodiment, a cleaning program is initiated, at least in part, by establishing that an ascent stage S3 has been reached. In additional or alternative exemplary embodiments, a cleaning program is initiated, at least in part, by establishing that a descent stage S7 has been reached. In further additional or alternative exemplary embodiments, a cleaning program is determined, at least in part, by establishing that a cruising stage S4 requiring relatively little engine thrust has been reached. In yet further additional or alternative exemplary embodiments, a cleaning program may be initiated after an aircraft has landed and enters an idle mode (e.g., while it is taxiing to the destination gate). For example, the engine 10 may enter an idle mode at the completion of a landing stage S8. As discussed above, cleaning during an idle mode or taxiing may advantageously remove foreign materials while internal engine temperatures (and thus temperatures of foreign materials) are still relatively hot. Moreover, any water reserves that remain on board can be utilized by the cleaning program since the water supply will be replenished when the aircraft reaches the gate. Thus, there is neither a schedule impact nor a weight impact when using any available water reserves that remain for cleaning during following a flight.

Optionally, one or more of the stages Si through S8 may be established according to location data. In some such embodiments, one or more geo-location modules (not pictured), e.g., altimeter or Global Positioning Satellite unit, may be provided to supply a location signal. The controller 100 (see FIG. 2) may receive the location signal and process that signal as location data. Specific location data may, in turn, establish that various flight stages have been reached. For instance, location data of a predetermined altitude, change in altitude, or GPS coordinate may be used to establish a specific flight stage. In response to that specific flight stage may a cleaning program to be initiated by the controller 100 (see FIG. 2).

Turning to FIG. 2, again, the controller 100 may be configured to initiate multiple sequential or simultaneous cleaning programs. As a result, multiple portions of cleaning fluid 70 may be directed to the non-atomizing nozzle 76. Similarly, multiple corresponding deliveries of cleaning fluid 70 may be initiated. If the cleaning fluid 70 includes a primary liquid 72, directing the cleaning fluid 70 may require motivating the primary liquid 72 from the reservoir 78 through a fluid conduit 90 via, e.g., a pump 80. Each direction of cleaning fluid 70 and initiation of delivery by the controller 100 may be substantially identical or different according to the cleaning program. For instance, directing fluid in response to one cleaning program may include only supplying a primary liquid 72, while directing fluid in response to another cleaning program may include introducing a select amount of secondary agent 74 into the primary liquid 72.

In an exemplary embodiment, a first cleaning program is determined at an ascent stage S3 (see FIG. 6). In response to the determination, a portion of the primary liquid 72 is directed to the non-atomizing nozzle 76 and delivered therefrom. Subsequently, reduced combustion, e.g., ceased combustion or an idle mode, within the core turbine engine 14 is established. Upon establishing that reduced combustion, the initiation of a new cleaning program may be triggered. Optionally, in response to the initiation of a new cleaning program, another portion of the primary liquid 72 is mixed with a secondary agent 74 and directed to the non-atomizing nozzle 76 as a cleaning fluid 70. The cleaning fluid 70 mixture is then delivered to the primary gas path 65, as described above.

Although cleaning fluid 70 is configured to remove/prevent the accumulation of foreign materials, it is possible that delivery of cleaning fluid 70 may also influence power generation through the core turbine engine 10. If left unregulated, the influence may affect the engine's thrust output. For instance, delivery of the cleaning fluid 70 may increase the compression of air flowing through the core turbine engine 14, reducing power requirements of the compressor(s) 22, 24 and allowing for more thrust to be generated at the turbine(s) 28, 30 (see FIG. 1). In optional embodiments, the controller 100 may be configured to account for such conditions and influences. Accordingly, the controller 100 of some embodiments is configured to tune thrust output in response to delivery of the cleaning fluid 70. In one exemplary embodiment, the controller 100 operatively maintains a predetermined thrust level for the entire engine 10. If lower power is required at the compressor(s) 22, 24, power output by the turbine(s) 28, 30 (see FIG. 1) may be proportionally reduced as the cleaning fluid is delivered to the primary gas path 65. As a result, predetermined level may be substantially the same both before and after delivery of the cleaning fluid 70. The total thrust generated by the engine 10 may, thus, be unchanged and consistent during delivery of the cleaning fluid 70. The impact that the presence of water in the gas path 65 might have on the thrust may result in lower operating temperatures of the turbine(s) and/or compressor (s) 22, 24. This may result in decreasing temperatures through the internal gas path 65 below the threshold at which accumulation of foreign materials (e.g., formation of CMAS) is likely to occur, further mitigating the buildup of foreign materials and CMAS in the engine core 14.

Figure 7:
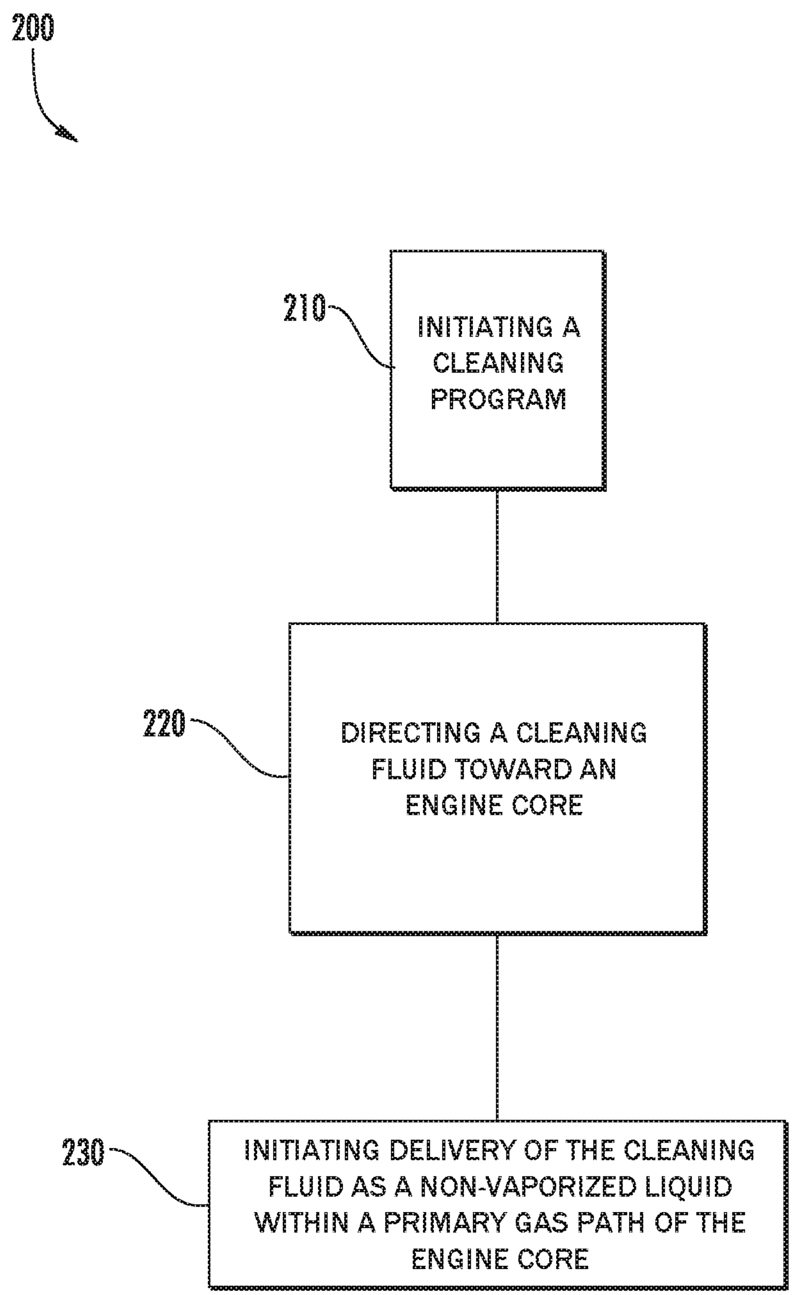
FIG. 7 provides a flow chart illustrating a method of cleaning a turbine engine in accordance with one or more embodiments of the present disclosure.

Turning now to FIG. 7, a flow diagram is provided of an example method (200) according to an example embodiment of the present disclosure. Generally, the method (200) provides for on-wing cleaning of a gas turbine engine that includes a compressor and an airfoil, as described above. The method (200) can be performed, for instance, by the controller 100. FIG. 7 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure.

At (210), the method (200) includes initiating a cleaning program. A cleaning program may be caused by activation of a manual user interface or an automated condition indicative of potential or actual accumulation of foreign materials (e.g., CMAS based reaction products or precursors thereto). In some embodiments, (210) includes receiving a pre-buildup abatement signal. In other embodiments, (210) includes receiving a particulate detection signal from one or more sensors attached to the engine. In further embodiments, (210) includes determining a temperature limit has been exceeded. In still further embodiments, (210) buildup event includes determining reduced or ceased combustion within the gas turbine engine.

Multiple discrete flight stages may be provided as part of a predetermined flight schedule, as described above. In some such embodiments, the method (200) provides for executing the flight schedule such that (210) includes establishing at least one of the predetermined stages has been reached. Optionally, establishing that a flight stage has been reached may include receiving a location signal, e.g., from one or more geo-location module.

At (220), the method (200) includes direct a cleaning fluid toward an engine core (e.g., the compressor of a gas turbine engine). The cleaning fluid may include a primary liquid and a secondary agent, as described above. If a reservoir is provided for storing a portion of the primary liquid, (220) may include motivating the primary liquid from the reservoir. Optionally, (220) includes selectively introducing the secondary agent into the primary liquid. The primary liquid and secondary agent may, thus, provide a cleaning fluid mixture to the non-atomizing nozzle.

At (230), the method (200) includes initiating delivery of the cleaning fluid as a non-vaporized liquid to a primary gas path of the engine core (e.g., to an airfoil therein). The delivered cleaning fluid may remove accumulated foreign materials or prevent the formation of foreign materials, as described above. In certain embodiments, delivery of the cleaning fluid may influence combustion within the engine. The method (200) may account for such influences by tuning engine output. The tuning may include, for instance, maintaining an engine thrust at a predetermined level during delivery of the cleaning fluid. In other words, the predetermined level being maintained is substantially equal before the delivery of the cleaning fluid as it is after the delivery of the cleaning fluid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for cleaning of an installed gas turbine engine comprising an engine core and defining a primary gas path, the engine core including at least one airfoil extending into the primary gas path, the method comprising:

initiating a cleaning program, wherein initiating the cleaning program comprises;

executing a flight schedule having a plurality of predetermined flight stages, wherein the plurality of predetermined flight stages comprises a cruising stage and a descent stage; and establishing that the installed gas turbine engine is in one of the cruising stage or the descent stage;

directing a cleaning fluid toward the engine core in response to the initiation of the cleaning program; and initiating delivery of the cleaning fluid through a non-atomizing nozzle as a non-vaporized liquid within the primary gas path to the engine core.

2. The method of claim 1, wherein initiating the cleaning program includes receiving a pre-buildup abatement signal.

3. The method of claim 1, wherein initiating the cleaning program includes receiving a particulate detection signal.

4. The method of claim 1, wherein initiating the cleaning program includes determining a temperature limit has been exceeded.

5. The method of claim 1, wherein the cleaning fluid includes a primary liquid, wherein the gas turbine engine encloses a reservoir configured to store the primary liquid, and wherein directing the cleaning fluid includes motivating the primary liquid from the reservoir.

6. The method of claim 5, wherein directing the cleaning fluid includes selectively introducing a secondary agent into the primary liquid.

7. The method of claim 1, wherein initiating the cleaning program includes determining reduced combustion within the gas turbine engine.

8. A method for cleaning of an installed gas turbine engine comprising an engine core and defining a primary gas path, the engine core including at least one airfoil extending into the primary gas path, the method comprising:

initiating a cleaning program;

directing a cleaning fluid toward the engine core in response to the initiation of the cleaning program;

initiating delivery of the cleaning fluid through a non-atomizing nozzle as a non-vaporized liquid within the primary gas path to the engine core; and tuning engine output, including maintaining an engine thrust at a predetermined level during delivery of the cleaning fluid to the gas turbine engine in-flight.

9. A method for cleaning of a gas turbine engine installed on an aircraft, the gas turbine engine comprising an engine core and defining a primary gas path, the engine core including at least one airfoil extending into the primary gas path, the method comprising:

executing a flight schedule having a plurality of predetermined flight stages, wherein the plurality of predetermined flight stages comprises a takeoff stage, and ascent stage, a cruising stage, a descent stage, and a landing stage;

establishing that the landing stage has been completed;

taxiing the aircraft with the gas turbine engine operating in an idle mode;

initiating a cleaning program;

directing a cleaning fluid toward the engine core in response to the initiation of the cleaning program; and initiating delivery of the cleaning fluid through a non-atomizing nozzle as a non-vaporized liquid within the primary gas path to the engine core while the aircraft is taxiing.

10. The method of claim 9, wherein the cleaning fluid is carried on board the aircraft.

11. The method of claim 9, wherein the cleaning fluid comprises a water on board the aircraft, the method further comprising:

taxiing the aircraft to a destination gate;

establishing a reduced combustion state within the gas turbine engine by ceasing combustion; and replenishing the water on board the aircraft.

* * * * *